United States Patent [19]
Gerhardt

[11] Patent Number: 5,918,835
[45] Date of Patent: Jul. 6, 1999

[54] WINGTIP VORTEX IMPELLER DEVICE FOR REDUCING DRAG AND VORTEX CANCELLATION

[75] Inventor: Heinz Adolf Gerhardt, Redondo Beach, Calif.

[73] Assignee: Northrop Grumman Corporation, Los Angeles, Calif.

[21] Appl. No.: 09/038,813

[22] Filed: Mar. 11, 1998

[51] Int. Cl.⁶ .................................................. B64C 23/02
[52] U.S. Cl. ............................................ 244/199; 244/58
[58] Field of Search ................................ 244/199, 58, 55; 416/223; 415/DIG. 1, 1, 2–4; 290/43, 49, 59, 55

[56] References Cited

U.S. PATENT DOCUMENTS

| | | | |
|---|---|---|---|
| 1,849,547 | 3/1932 | Marsan | 244/58 |
| 4,045,144 | 8/1977 | Loth | 244/199 |
| 4,047,832 | 9/1977 | Sforza | 244/199 |
| 4,917,332 | 4/1990 | Patterson, Jr. | 244/199 |
| 5,100,085 | 3/1992 | Rubbert | 244/199 |

*Primary Examiner*—Galen L. Barefoot
*Attorney, Agent, or Firm*—Terry J. Anderson; Karl J. Hoch, Jr.

[57] ABSTRACT

The present invention is a wingtip vortex device installed at the wingtips of an aircraft for induced drag reduction and vortex cancellation. Also, the wingtip vortex device is self-contained and is powered by the wingtip vortex. The wingtip vortex device comprises a shaft coupled between the wing and a spinner. The spinner is a streamlined body of revolution with a number of radial fins. The wingtip vortex of the aircraft induces spinner whirl, which is opposite to that of the wingtip vortex. As a result, the spinner-induced whirl produces an upwash superimposed on the downwash of the vortex. Thus, the total downwash, and hence the induced drag, are reduced.

15 Claims, 1 Drawing Sheet

WINGTIP VORTEX IMPELLER DEVICE FOR REDUCING DRAG AND VORTEX CANCELLATION

BACKGROUND OF THE INVENTION

1. Field of the Invention

The present invention relates to vortex cancellation for aircraft in general, and in particular to a wingtip vortex device for induced drag reduction and vortex cancellation at the wingtip of aircraft.

2. Related Art

Current wingtip vortex devices operate on the principle of self-cancellation of counter-rotating vortices generated in tandem. Typical vortex devices employ a propeller or related rotary device mounted at wingtips to produce vortex cancellation. Many studies of anti-swirl-producing propellers have been performed and documented.

Typically, a propeller is installed ahead of or behind the wingtip chord where, as a byproduct of thrust generation, the propeller-generates swirl, while also weakening the wingtip vortex, to thereby reduce induced drag. However, since current propellers are designed to produce thrust efficiently, they are only marginally effective in producing counter-swirl. Such a deficiency was pointed out by Alexander Lippisch as reported by Snyder and Zumwalt in "Effects of Wingtip-Mounted Propellers on Wing Lift and Induced Drag," Journal of Aircraft, Vol. 6, No. 5, September–October 1969.

As a result, an impeller was disclosed as a more effective alternative. An impeller consists of an oval-oblong-shaped body having a multitude of slender fins on its periphery. The impeller can efficiently produce swirling flow. Snyder and Zumwalt achieved a 64-percent induced drag reduction with an impeller as described.

Nevertheless, although the impeller disclosed by Snyder and Zumwalt is quite efficient in producing swirling flow, it generates little or no thrust. Also, Snyder and Zumwalt do not provide information on the power needed to drive the impeller. Thus, a process which requires mechanical power (presumably from the propulsion system) to reduce drag has little technical merit.

Therefore, what is needed is a device that limits or eliminates wingtip vortices by utilizing a "free" power source, such as the rotational energy of the wingtip vortex itself, to drive the device. What is also desired is a device that utilizes the power extracted from a wingtip vortex to generate a counter-swirling flow.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a wingtip vortex device for induced drag reduction and vortex cancellation.

The wingtip vortex device of the present invention is an aerodynamic drag reduction system installed at the wingtips of an aircraft. Also, the wingtip vortex device is self-contained and is powered by the wingtip vortex. Consequently, induced drag is reduced without requiring an external power source such as the aircraft propulsion system.

The wingtip vortex device comprises a shaft coupled between the wing and a spinner. The spinner is a streamlined body of revolution with a number of radial fins. The wingtip vortex of the aircraft induces spinner whirl, which is opposite to that of the wingtip vortex. As a result, the spinner-induced whirl produces an upwash superimposed on the downwash of the vortex. Thus, the total downwash, and hence the induced drag, are reduced.

A feature of the present invention is embodied in a spinner device that limits or eliminates wingtip vortices by utilizing the rotational energy of the wingtip vortex itself. Yet another feature of the present invention is embodied in a device that utilizes the power extracted from a wingtip vortex to generate a counter-swirling flow.

An advantage of the present invention is that drag can be reduced without the need for an external power source. Another advantage of the present invention is that vortices can be limited or eliminated. Yet another advantage of the present invention is that it reduces the necessary distance between aircraft to allow more take-off and landings.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
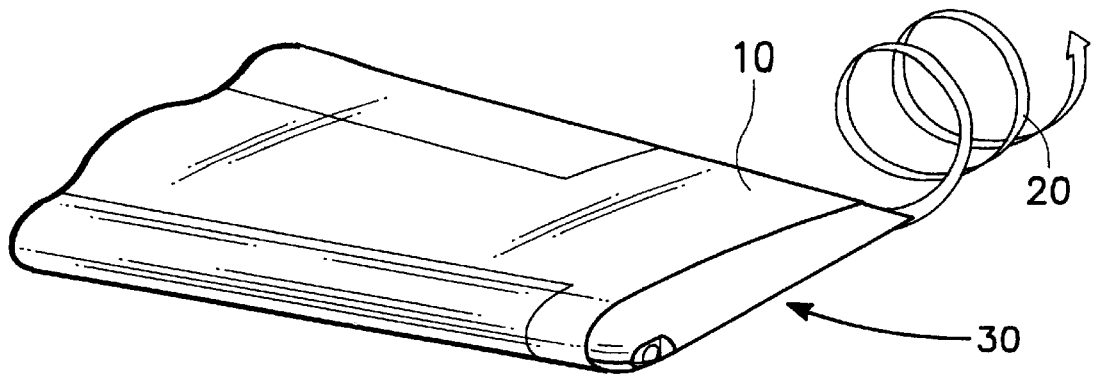
FIG. 1 is a perspective view illustrating a wingtip generating a vortex.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Introduction:

FIG. 1 is a perspective view illustrating a wingtip creating a vortex. During take-off, landing, and flight of an aircraft, the aircraft's wing 10, as it travels through the air, creates a vortex 20 (a vortex is a high-velocity, helically rotating air mass) at the aircraft's wingtip 30. Since the vortex is a high-velocity rotating air mass, numerous problems can occur during flight, take-off, and landing of the aircraft.

Principally, during flight of the aircraft, the vortex creates undesirable drag on the wing 10. To overcome that drag, more thrust is required from the engines, and the related increase in fuel usage limits the distance the aircraft can fly.

Furthermore, the vortex creates air traffic problems during takeoff and landing. Because the vortices are high-velocity rotating airstreams, a wingtip vortex of one aircraft can greatly disturb the airmass through which a following aircraft may pass. This vortex interference can lead to the loss of control of the following aircraft and thereby cause an accident. Consequently, aircraft are spaced great distances apart from each other during takeoff and landing so that there is sufficient time for the wingtip vortices to decay before they encounter another aircraft. This creates substantial delays and air traffic control problems. The vortex cancellation device of the present invention solves this problem by greatly reducing or eliminating wingtip vortices. Thus, with the present invention, the distance between aircraft during take-off and landing can be reduced to allow more take-offs and landing.

Figure 2:
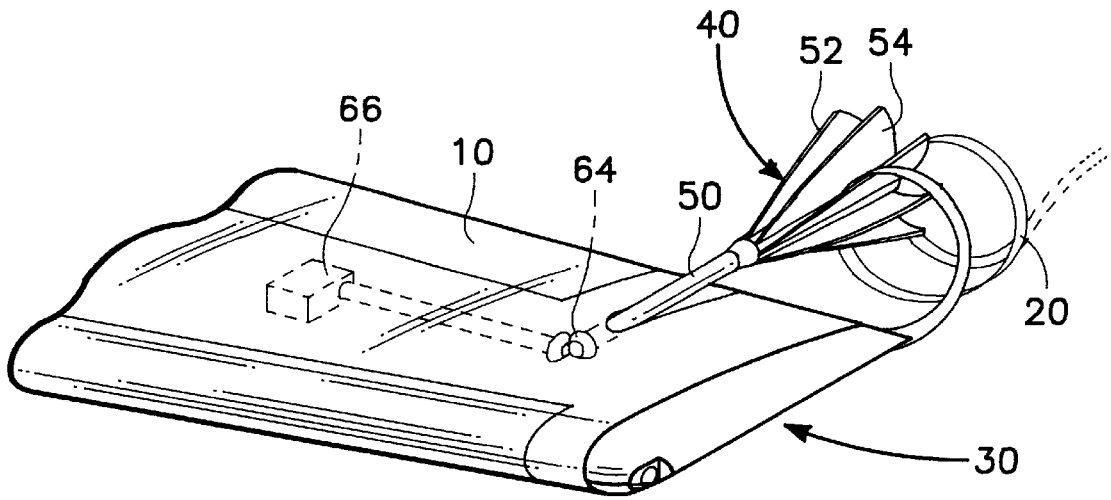
FIG. 2 is a perspective view of a wingtip vortex device system of the present invention.

Structure:

FIG. 2 illustrates a wingtip vortex device system of the present invention. The wingtip vortex device 40 of the present invention is a self-contained system installed at the wingtips 30 of an aircraft for reducing aerodynamic drag. The wingtip vortex device 40 is driven by the whirl of the wingtip vortex 20, and in the process the vortex 20 is weakened, thereby reducing aerodynamic drag. As such, an external power source, such as the aircraft propulsion system, is not required to power the vortex device 40.

Figure 3:
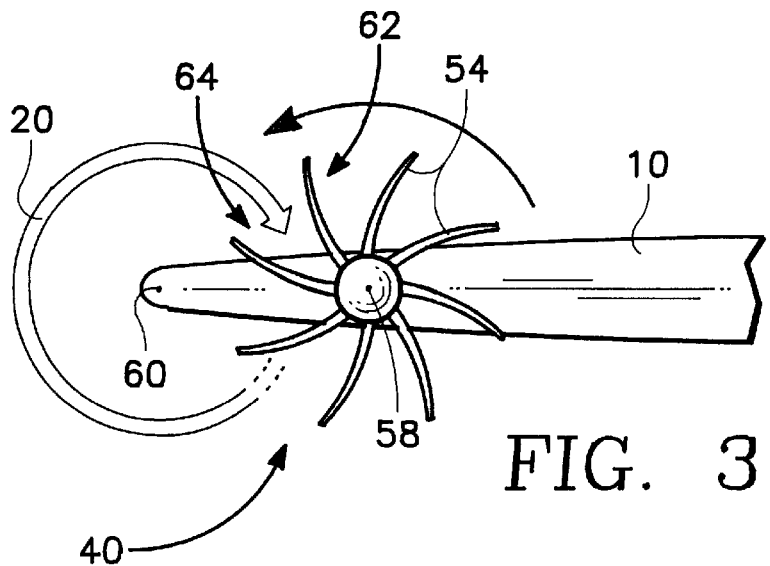
FIG. 3 is a rear view of the wingtip vortex device of FIG. 2.

Referring to FIG. 3 along with FIG. 2, FIG. 3 is a rear view of the wingtip vortex device of FIG. 2. The wingtip vortex device 40 is comprised of a shaft attached to the wing and a spinner 52. The spinner 52 is a streamlined body of revolution with a number of radial fins 54. The spinner's axis 58 is parallel to the axis 60 of the wingtip vortex 20. The spinner 52 is positioned inboard of the wingtip vortex 20 such that the outboard area 62 of each fin 54 extends into the inboard flowfield 64 of the wingtip vortex 20.

The fins or blades 54 of the spinner 52 are positioned to operate on the rotational flow components of the wingtip vortex to avoid a drag-producing deceleration of the axial flow components. The blades 54 are preferably in a streamwise orientation with little or no incidence relative to the free-stream flow vector. The blades'tips are preferably curved slightly backwards with respect to the rotation so that they point more nearly into the tangential flow vector of the vortex.

The shaft 50 of the spinner extends forward into the wing structure 10. The shaft 50 is preferably deflectable in pitch about its wing support so that the spinner axis 58 is kept parallel to the vortex axis 60 as the angle of attack changes. If desired, the shaft 50 of the spinner can be coupled to an internal generator 66 (such as a generator driver for driving aircraft subsystems) to extract power from the wingtip vortex 20 by the spinner 52. In the alternative, an internal gear device 64 can be coupled between the shaft 50 and the internal generator 66. However, it should be noted that such arrangements would be at the expense of the downwash reduction.

Operation:

Referring to FIG. 2, the spinner 52 is in direct contact with the wingtip vortex 20 and rotates in an opposite direction as the wingtip vortex 20. The wingtip vortex 20 weakens as it drives the spinner 52. Like meshing gears, the wingtip vortex 20 rotates the spinner 52 in opposite direction to that of the wingtip vortex 20 itself. The torque transmitted from the wingtip vortex 20 to the spinner 52 decreases the wingtip vortex circulation and, hence, reduces downwash and induced drag. The rotating spinner 52 of the wingtip vortex device 40 produces a counter-whirling airstream. This induced whirl further weakens the wingtip vortex when the two opposing whirls counteract each other farther downstream.

On the inboard side of the spinner 52, the upward motion of the induced whirl opposes the downwash of the wing. Thus, the downwash is reduced by the two-fold action of the weakened wingtip vortex and the opposing flow generated by the induced spinner whirl inboard of the device.

The vortex device 40 reduces downwash behind an aircraft for decreasing induced drag. Downwash is caused by the circulation of the wingtip vortices 20. As such, a reduction of wingtip vortex 20 circulation will cause a reduction of the induced drag.

The spinner 52 is solely propelled by the wingtip vortex 20, and thus, an external power source, such as the aircraft propulsion system, is not required to power the vortex device 40.

Since the blades'tips are curved in the direction slightly backward with respect to the rotation, they point more nearly into the tangential flow vector of the vortex. Thus, meshing of the spinner 52 and wingtip vortex 20 occurs under favorable conditions. For example, the fin tips, having the highest tangential velocity, extend into the vortex center where its tangential velocities are highest.

It is important to note that, although the spinner 52 generates drag on its own (unrelated to its rotary action), the induced-drag reduction outweighs the device's drag, especially at maneuvering flight conditions where induced drag is a multiple of the zero lift drag.

Almost any existing and future aircraft, including sailplanes and gliders, can utilize the wingtip vortex device of the present invention. If high total system efficiencies can be achieved, the design of aircraft utilizing the wingtip vortex device of the present invention could be materially affected. For instance, wing span would become less important as it would loose much of its induced drag determinacy. Shorter-span wings generate stronger tip vortices providing the vortex devices with a higher amount of vortex energy for conversion.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An aerodynamic drag reduction and vortex cancellation system for an aircraft wingtip characterized by a wingtip vortex induced adjacent thereto, the wingtip vortex generally defined by inboard and outboard vortex flowfields, the system comprising:

a propeller disposed adjacent the wingtip in fluid communication with the wingtip vortex, the propeller being generally defined by inboard and outboard propeller areas, the outboard propeller area extending into the inboard vortex flowfield, the propeller being sized and configured to rotate in an opposing rotational direction from that of the wingtip vortex in response to exposure to the inboard vortex flowfield for mitigating the wingtip vortex and reducing aerodynamic drag.

2. The aerodynaic drag reduction and vortex cancellation system of claim 1 further comprises a shaft, the propeller extends from the shaft.

3. The aerodynamic drag reduction and vortex cancellation system of claim 1 wherein the wingtip vortex is generally defined by a vortex axis of rotation and the propeller is generally defined by a propeller axis of rotation, the propeller axis of rotation is disposed generally parallel to the vortex axis of rotation.

4. The aerodynamic drag reduction and vortex cancellation system of claim 3 wherein the propeller having a plurality of fins, the propeller axis and the vortex axis are positioned at least the length of one of the fins apart.

5. The aerodynamic drag reduction and vortex cancellation system of claim 1 wherein the propeller has a propeller axis of rotation, the angular orientation of the propeller axis of rotation is adjustable.

6. The aerodynamic drag reduction and vortex cancellation system of claim 2, further comprising an intermediate gear device coupled between said shaft and a power generator.

7. The aerodynamic drag reduction and vortex cancellation system of claim 6, wherein said intermediate gear device is a bevel set of gears.

8. The aerodynamic drag reduction and vortex cancellation system of claim 7, wherein said bevel set comprises a first bevel gear meshing with a second bevel gear.

9. The aerodynamic drag reduction and vortex cancellation system of claim 8, wherein said first bevel gear is connected to said shaft, said second bevel gear is attached to said power generator.

10. The aerodynamic drag reduction and vortex cancellation system of claim 9, wherein said power generator is driven solely by said shaft and does not require an additional power source.

11. The aerodynamic drag reduction and vortex cancellation system of claim 2, wherein said shaft is coupled to a power generator.

12. An aerodynamic drag reduction and vortex cancellation system comprising:

an aircraft wing having an aircraft wingtip characterized wingtip vortex induced adjacent thereto, the wingtip vortex generally defined by inboard and outboard vortex flowfields; and a propeller disposed adjacent the wingtip in fluid communication with the wingtip vortex, the propeller being generally defined by inboard and outboard propeller areas, the outboard propeller area extending into the inboard vortex flowfield, the propeller being sized and configured to rotate in an opposing rotational direction from that of the wingtip vortex in response to exposure to the inboard vortex flowfield for mitigating the wingtip vortex and reducing aerodynamic drag.

13. A method of reducing aerodynamic drag reduction and canceling vortex forces adjacent an aircraft wingtip characterized by a wingtip vortex induced adjacent thereto, the wingtip vortex generally defined by inboard and outboard vortex flowfields, the method comprising the steps of:

(a) locating a propeller adjacent the wingtip in fluid communication with the wingtip vortex, the propeller being generally defined by inboard and outboard propeller areas, (b) extending the outboard propeller area into the inboard vortex flowfield, the propeller being sized and configured to rotate in an opposing rotational direction from that of the wingtip vortex in response to exposure to the inboard vortex flowfield for mitigating the wingtip vortex and reducing aerodynamic drag.

14. The method of reducing aerodynamic drag reduction and canceling vortex forces of claim 13 further comprises the step of attaching a power generation device in mechanical communication with the propeller for extracting power from the wingtip vortex.

15. The method of reducing aerodynamic drag reduction and canceling vortex forces of claim 14 wherein the propeller has an axis of rotation, the method further comprises the step of adjusting the angular orientation of the axis of rotation of the propeller.

* * * * *